United States Patent
Kita

(10) Patent No.: US 8,401,494 B2
(45) Date of Patent: Mar. 19, 2013

(54) WIRELESS COMMUNICATION APPARATUS AND SYSTEM EMPLOYING THE SAME APPARATUSES AND METHOD FOR CONTROLLING A PLURALITY OF THE SAME APPARATUSES

(75) Inventor: Hitoshi Kita, Osaka (JP)

(73) Assignee: Icom Incorporated, Osaka (JP)

( * ) Notice: Subject to any disclaimer, the term of this patent is extended or adjusted under 35 U.S.C. 154(b) by 728 days.

(21) Appl. No.: 12/289,659

(22) Filed: Oct. 31, 2008

(65) Prior Publication Data

US 2009/0111391 A1    Apr. 30, 2009

(30) Foreign Application Priority Data

Oct. 31, 2007   (JP) ................. 2007-284006

(51) Int. Cl.
*H04B 1/44* (2006.01)
*H04B 1/00* (2006.01)
*H04B 5/00* (2006.01)

(52) U.S. Cl. .............. 455/78; 455/69; 455/41.1

(58) Field of Classification Search .......... 455/3.01, 455/3.02, 3.03, 3.05, 574, 234.1, 522, 456.3, 455/69

See application file for complete search history.

(56) References Cited

U.S. PATENT DOCUMENTS

| | | | |
|---|---|---|---|
| 2,939,139 A | 5/1960 | Handler | |
| 6,078,797 A * | 6/2000 | Kashimura | 455/234.1 |
| 6,442,375 B1 | 8/2002 | Parmentier | |
| 6,978,149 B1 * | 12/2005 | Morelli et al. | 455/522 |
| 7,577,447 B2 * | 8/2009 | Itoh et al. | 455/456.3 |
| 2002/0082060 A1 * | 6/2002 | Kang et al. | 455/574 |
| 2004/0018817 A1 * | 1/2004 | Kanayama et al. | 455/77 |
| 2005/0233704 A1 * | 10/2005 | Maekawa | 455/69 |
| 2006/0125684 A1 | 6/2006 | Leinonen et al. | |
| 2006/0232465 A1 | 10/2006 | Levin et al. | |
| 2007/0098059 A1 | 5/2007 | Ives et al. | |
| 2009/0040100 A1 | 2/2009 | Levin et al. | |
| 2010/0052420 A1 * | 3/2010 | Kang | 307/31 |
| 2010/0141509 A1 | 6/2010 | Levin et al. | |

FOREIGN PATENT DOCUMENTS

| | | |
|---|---|---|
| EP | 1 201 038 | 1/2009 |
| EP | 1 632 030 | 8/2010 |
| JP | 1-296719 | 11/1989 |
| JP | 2005-252604 | 9/2005 |
| JP | 2007-143130 | 6/2007 |
| WO | 2006/107381 | 10/2006 |

\* cited by examiner

*Primary Examiner* — Andrew Wendell
*Assistant Examiner* — Cindy Trandai
(74) *Attorney, Agent, or Firm* — Wenderoth, Lind & Ponack, L.L.P.

(57) ABSTRACT

At least two or more wireless communication apparatuses of the present invention are located adjacent or separately in a relatively confined area. The output portion of any one currently used wireless communication apparatus of the wireless communication apparatuses is connected to the input portion of each of the other standby wireless communication apparatus. While a radio signal is transmitted from the transmitter of the currently used wireless communication apparatus, a reception limit signal is transmitted from the output portion of the currently used apparatus to the respective input portion of each of the nearby standby apparatuses so that the reception ability of the receiver of the standby apparatus is effectively limited.

8 Claims, 4 Drawing Sheets

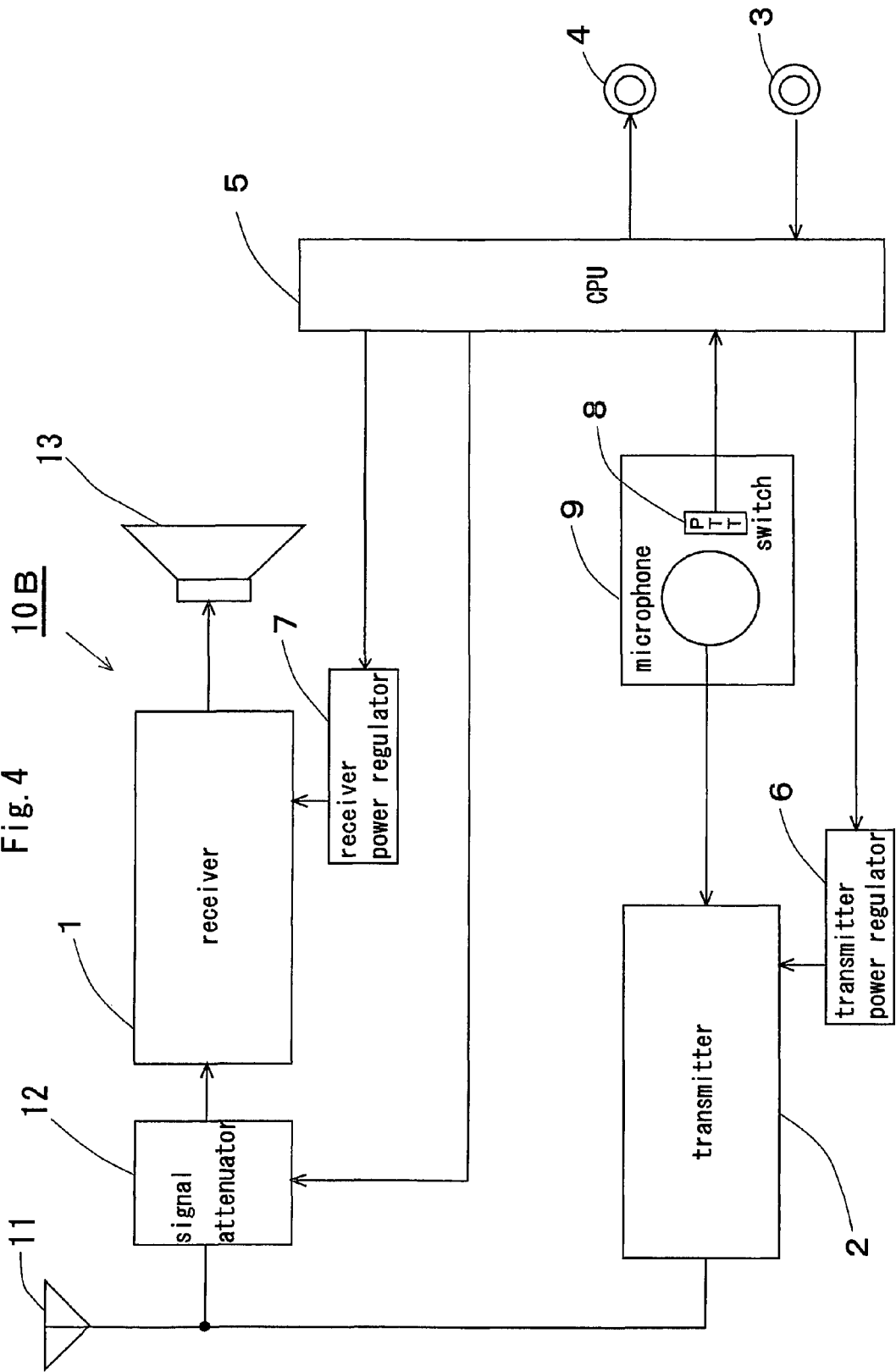

US 8,401,494 B2

WIRELESS COMMUNICATION APPARATUS AND SYSTEM EMPLOYING THE SAME APPARATUSES AND METHOD FOR CONTROLLING A PLURALITY OF THE SAME APPARATUSES

TECHNICAL FIELD OF THE INVENTION

The present invention relates to a wireless communication apparatus, a wireless communication system employing a plurality of such wireless communication apparatuses that is employed in a wireless communication system in which other wireless communication apparatuses are used as standby apparatuses during the operation of any one of currently used wireless communication apparatus of those apparatuses, and a method for controlling a plurality of the same apparatuses.

BACKGROUND OF THE INVENTION

As a precaution against malfunctions, boats and ships or the like which use wireless communication apparatuses are equipped, for example, with two wireless communication apparatus. Both apparatuses are turned on, one predetermined unit of which is used as the main wireless communication apparatus, and the other is held in reserve as a standby unit.

Under these circumstances, the signals transmitted from the one main wireless communication apparatus are received by the other spare wireless communication apparatuses i.e. the other standby apparatuses.

A technique for switching between the currently used apparatus (this is called a current apparatus) and the standby apparatus during the use of such wireless communication apparatuses has been disclosed, for example, in the following patent document 1.

Patent Document 1: Laid open Japanese Patent Publication (unexamined) No. 296719/1989

When two wireless communication apparatuses, for example, are provided in a limited space such as in boats and ships or the like, the antennas for the two wireless communication apparatuses must be set up adjacent to each other. In such cases, the signal strength from the main wireless communication apparatus will be too strong for the other adjacent standby wireless communication apparatus, and the receiver of the standby wireless communication apparatus may therefore become damaged. Even if the receiver is not damaged, there have been problems in that the radio signals from the main wireless communication apparatus act as interference on the adjacent standby wireless communication apparatus.

Furthermore, even when a main wireless communication apparatus, i.e. a current wireless communication apparatus, and at least one more standby wireless communication apparatus are operated on unequal frequencies separately from each other, there have been problems in that a noise or voice sound is put out from the speaker of the standby apparatus due to spurious signals included in the signals transmitted from the main wireless communication apparatus.

However, no technique for eliminating the problems described above has been disclosed in the above-mentioned Patent Document 1 or the like, and in actuality users must resort to manually turning off the standby wireless communication apparatus, lowering the volume of the standby wireless communication apparatus, or the like, which is inconvenient.

SUMMARY OF THE INVENTION

An object of the present invention, which was designed to overcome the various drawbacks noted above, is to provide a wireless communication apparatus, as well as a wireless communication apparatus system, in which a signal transmitted from a certain main wireless communication apparatus does not produce problems in other wireless communication apparatuses, even when a plurality of wireless communication apparatuses is set up relatively closely apart. The antennas for the wireless communication apparatuses are therefore set up in adjacent locations.

The wireless communication apparatus according to a first aspect of the invention is basically composed of a receiver for receiving a radio signal from outside, a transmitter for transmitting a radio signal outside, an input portion to which a reception limit signal is input from outside, an output portion from which a reception limit signal is transmitted outside, a reception controller for limiting the reception ability of said receiver while a reception limit signal has been input to the input portion, and a limit signal controller for sending out the reception limit signal to said output portion while said transmitter is transmitting a signal therefrom.

In another aspect of a wireless communication apparatus according to the invention, while a reception limit signal is input into the input portion, the power supply to the receiver is stopped by the reception controller. While no reception limit signals are input into the input portion, the power supply to the receiver is controlled by the reception controller.

In yet another aspect of a wireless communication apparatus according to the invention, a signal attenuator is connected to the signal input component of the receiver. While a reception control signal is input to the reception controller, the signal attenuator is activated, whereby a received signal is attenuated. While no reception control signals are input to the input portion, the signal attenuator is not activated, whereby a received signal is transferred to the receiver without being attenuated.

In still another aspect of a wireless communication system according to the invention, the wireless communication system having at least two or more wireless communication apparatuses, each of which comprises a receiver for receiving a radio signal, a transmitter for transmitting a radio signal, an input portion to which a reception limit signal is input, an output portion for putting out of a reception limit signal outside, a reception controller for limiting the reception ability of the receiver while the input portion is receiving a reception limit signal from outside, and a limit signal controller for sending out a reception limit signal to the output portion while the transmitter is transmitting a signal therefrom.

The output portion of any one of those wireless communication apparatuses is connected to each input portion of the other wireless communication apparatus. While a signal is transmitted from any one of the other wireless communication apparatuses, the limit signal controller of any one of the others is to output a reception limit signal into each input portion of the other wireless communication apparatuses, whereby the respective reception ability of each receiver of the other wireless communication apparatuses is limited.

Another aspect of the present invention relates to a method for controlling a plurality of wireless communication apparatuses according to the invention, each of which comprises a receiver for receiving a radio signal, a transmitter for transmitting a radio signal, an input portion to which a reception limit signal is input, an output portion for putting out of a reception limit signal outside, a reception controller for limiting the reception ability of the receiver while a reception limit signal being input into said input portion and a limit signal controller for sending out a reception limit signal to said output portion while the transmitter is transmitting a signal therefrom, in which the output portion of any one of those wireless communication apparatuses is connected to each input portions of the other wireless communication apparatus.

While a signal is transmitted from any one of the wireless communication apparatuses, the limit signal controller of the any one of the wireless communication apparatuses is to output a reception limit signal to each input portion of the other wireless communication apparatuses, whereby the respective reception ability of each receiver of the other wireless communication apparatuses is limited.

According to the wireless communication apparatus of the invention, the reception ability of the receiver is limited via the input portion when a reception limit signal is input from another wireless communication apparatus. A radio signal transmitted from another nearby wireless communication apparatus such as a standby wireless communication apparatus is prevented from being received at too great of an intensity. The receivers can thereby be effectively protected.

According to another wireless communication apparatus of the invention, the power supply to the receiver is stopped when a reception limit signal is input from another wireless communication apparatus to the input portion, thereby making it possible to securely prevent a radio signal transmitted from another wireless communication apparatus from being received at too great of an intensity.

According to yet another wireless communication apparatus of the invention, when a reception limit signal is input from another wireless communication apparatus to the input portion, the signal attenuation means is activated to attenuate the receiver output level of the radio signal that is input to the receiver, allowing the minimum receiver function to be maintained.

According to a wireless communication system of the present invention in which at least two wireless communication apparatuses are used, and the output portion of any one of those wireless communication apparatuses is connected to each input portion of the other wireless communication apparatuses, in cases where the plurality of wireless communication apparatuses are located in a relatively confined area, when a radio signal is transmitted from the transmitter of the currently used main wireless communication apparatus, a reception limit signal is transmitted from the output portion of the currently used wireless communication apparatus to the input portion of the nearby standby wireless communication apparatus, the reception ability of each receiver of the respective standby wireless communication apparatuses is limited, and unwanted noise is effectively prevented from being produced from the receiver of the respective standby wireless communication apparatuses on the basis of radio signal transmitted from the currently used wireless communication apparatus.

In addition, when a radio signal is transmitted from the currently used wireless communication apparatus, the signal attenuation means connected to the receiver of the standby wireless communication apparatus located near the main wireless communication apparatus is activated by the reception controller of the standby wireless communication apparatus to effectively attenuate the level of the radio signal input to the receiver from the main wireless communication apparatus, thereby effectively preventing unwanted noise or the like from being produced from the receiver of the stand wireless communication apparatus.

BRIEF DESCRIPTION OF THE DRAWINGS

FIG. 4 is a block diagram of a second embodiment of the wireless communication apparatus of the invention.

DETAILED DESCRIPTION OF THE PREFERRED EMBODIMENT

A detailed description will be provided in accordance with figures illustrating the radio communication device according to a preferred embodiment of the invention.

The wireless communication apparatus related to the invention involves the use of at least two or more wireless communication apparatuses 10 connected by a dedicated line. As a dedicated line, for example, a shielded insulating wire or cable is available.

Figure 1:
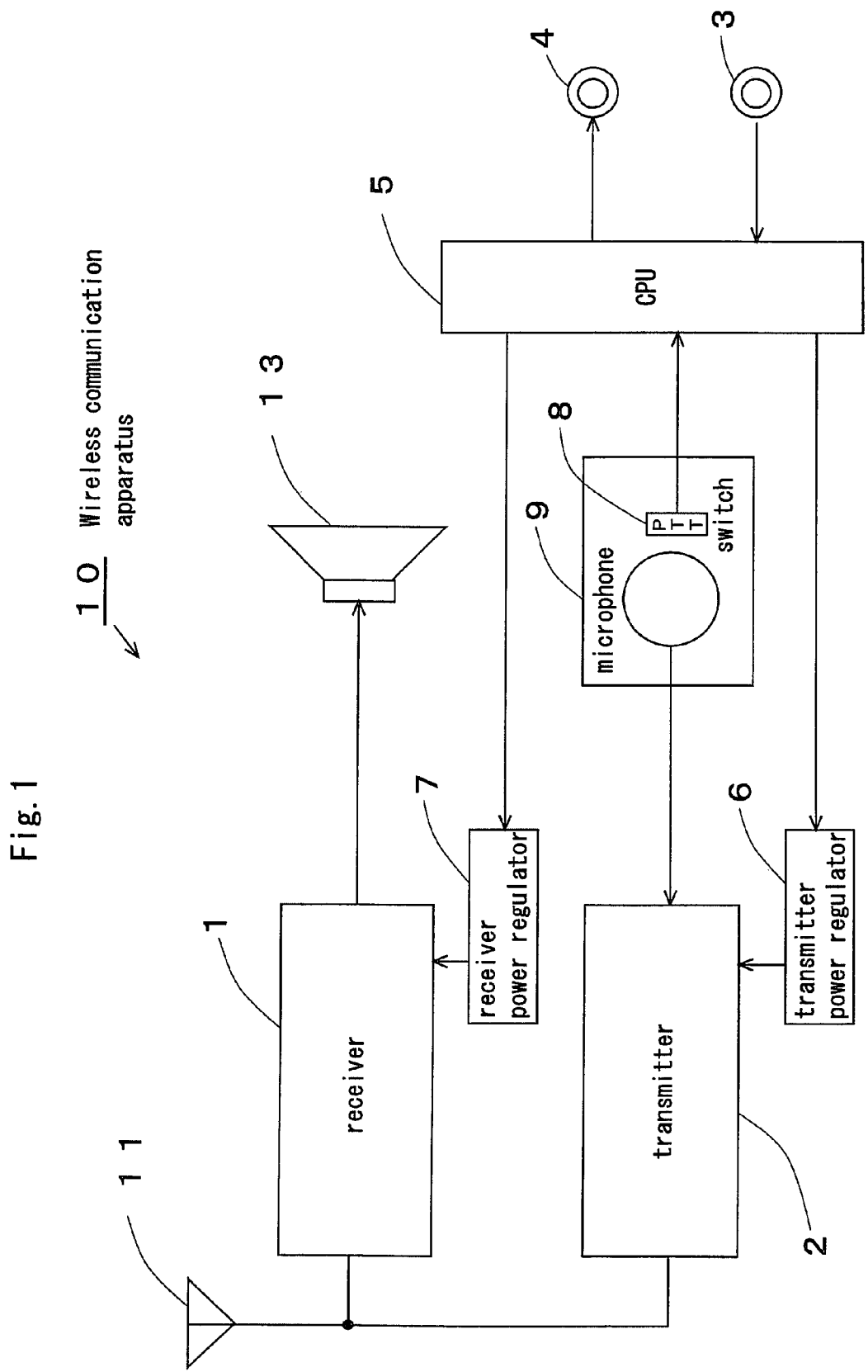
FIG. 1 is a block diagram of a first embodiment of the wireless communication apparatus of the invention.

As illustrated in FIG. 1, the wireless communication apparatus 10 is composed of a receiver 1, transmitter 2, an input portion 3 for receiving limit signals described in detail below (FIG. 3) from the outside via the dedicated line, an output portion 4 for transmitting reception limit signals to the outside via the dedicated line, a CPU (central processing unit) 5 for comprehensively controlling the components, a transmitter regulator 6 for supplying power to the transmitter 2, a receiver regulator 7 for supplying power to the receiver 1, and a microphone 9 with a PTT (Push To Talk) switch 8.

When the user presses the PTT switch 8 while the receiver 1 is operating in a wireless communication apparatus 10 having the above structure, the operating state of the PTT switch 8 is detected by the CPU5, and the CPU5 continues the output of the reception limit signals from the output portion 4, limits, as described in detail below, the reception ability of the other standby wireless communication apparatus connected by the dedicated line to the relevant wireless communication apparatus, that is, the currently used main wireless communication apparatus 10, and starts the transmission of radio signals from the transmitter 2 of the currently used wireless communication apparatus 10.

Further, the wireless communication apparatus 10 equipped with a common antenna 11 used in common for the receiver 1 and transmitter 2, speaker 13 connected with the receiver 1 and any other necessary components (not shown), display, controls, power unit and on the like.

The release of the push on the PTT switch 8 is detected by the CPU5. The CPU5 stops the output of the reception limit signal to the output portion 4, and stops the transmission of radio signals from the transmitter 2, as described below.

The transmitter regulator 6 also supplies and stops power to the transmitter 2 in response to control signals from the CPU5. The other receiver regulator 7 supplies and stops power to the receiver 1 in response to control command signals from the CPU5.

When the input of reception limit signals to the input portion 3 is detected, the CPU5 acts as a receiver controller for limiting the reception ability of the receiver 1, and when radio signal transmission from the transmitter 2 is detected, acts as a limit signal controller so that reception limit signals are transmitted from the output portion 4 to the outside.

Example 1

Described below are examples in which a plurality of wireless communication apparatuses according to the invention are set up so as to be adjacent to each other a short distance apart. The apparatuses are connected together by a dedicated wire and used, such as when arranged, for example, in the same boat or the same building. In this case, these wireless communication apparatuses can be located separately at a distance or adjacently.

In the following description, M refers to a main (currently used) wireless communication apparatus which is any one of the located apparatuses, and the other standby wireless communication apparatuses are referred to as sub wireless communication apparatuses S.

Figure 2:
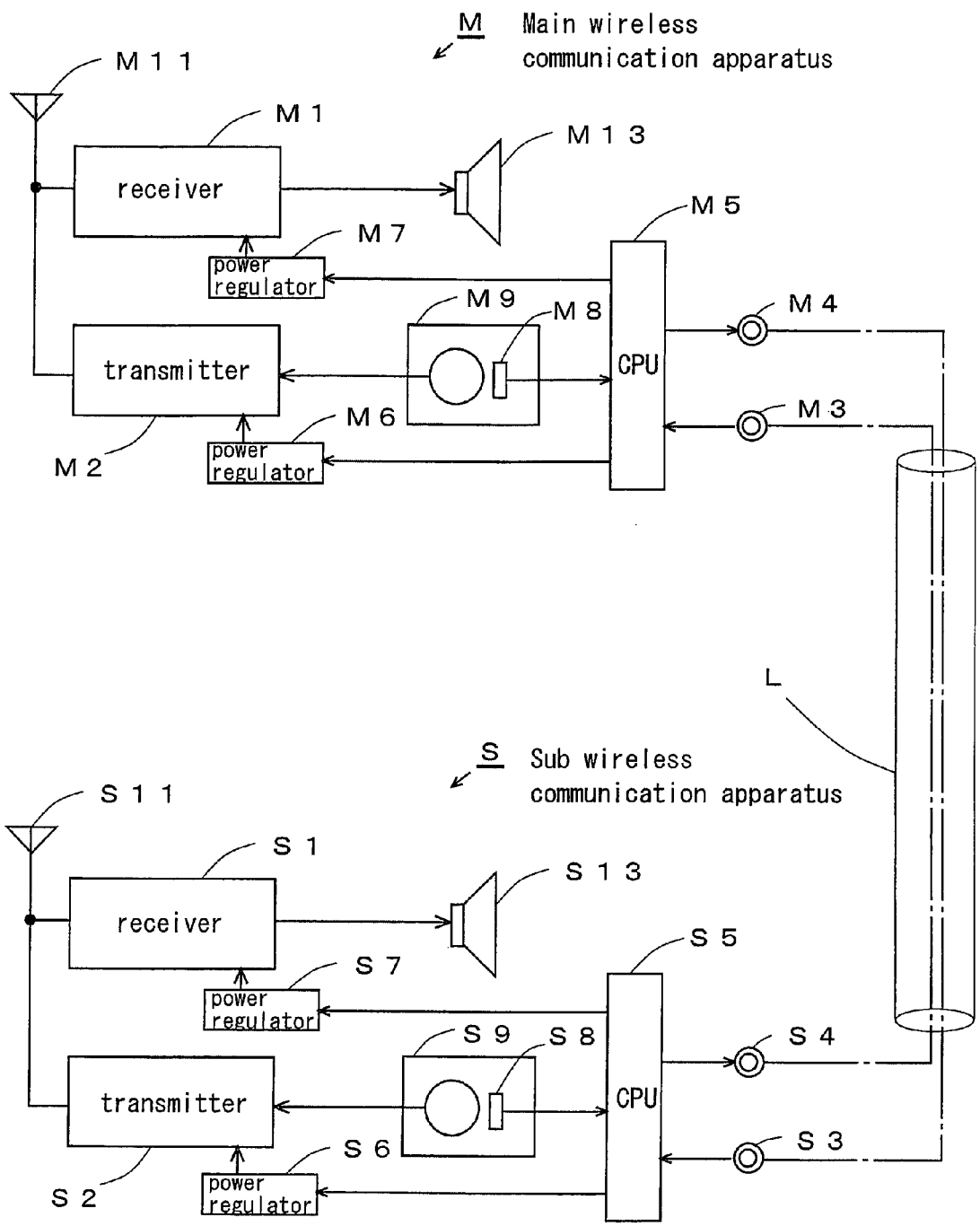
FIG. 2 is a block diagram of a wireless communication system composed of two wireless communication apparatuses of the invention.

FIG. 2 illustrates a wireless communication system composed of a main wireless communication apparatus M for transmission and a sub apparatus S as a standby apparatus connected by a dedicated line L.

In the main wireless communication apparatus M of FIG. 2, the letter M is attached to the numbers used for components which are the equivalent of the structural components of the wireless communication apparatus 10 in FIG. 1. Similarly, the letter S is attached to the numbers also used for components which are the equivalent of the structural components of the wireless communication apparatus 10. These structural components will not be further elaborated.

The main wireless communication apparatus M is composed of a receiver M1, a transmitter M2, an input portion M3, an output portion M4, CPU M5, a transmitter regulator M6, and receiver regulator M7. That main wireless communication apparatus M is briefly called a "main apparatus M" here after. A microphone M9 having a PTT switch M8 is also connected. Other necessary components include an antenna M11 shared by the receiver M1 and transmitter M2, a speaker M13 connected to the receiver M1, and other parts which are not shown, such as a display, operating components, and power components.

The sub apparatus S is composed of a receiver S1, a transmitter S2, an input portion S3, an output portion S4, CPU S5, a transmitter regulator S6, and a receiver regulator S7. A microphone S9 having a PTT switch S8 is also connected. That sub apparatus M is briefly called a "sub apparatus S" here after. Other necessary components include an antenna S11 shared by the receiver S1 and transmitter S2, a speaker S13 connected to the receiver S1, and other parts which are not shown, such as a display, operating components, and power components.

Described next will be the operation of the wireless communication system composed of the two wireless communication apparatuses above as illustrated in FIG. 2, along with a timing chart shown in FIG. 3.

First, when the PTT switch M8 of the microphone M9 connected to the main apparatus M is pushed at the time T1, the CPU M5 of the main apparatus M starts to observe whether the PTT switch M8 is depressed continuously throughout a predetermined period of time. When it is detected at the time T2 that the PTT switch M8 has been depressed continuously all that while, the transmitter regulator M6 is controlled to commence supplying power to the transmitter M2 and results in rendering the transmitter M2 operational.

Simultaneously, when the CPU M5 determines that the transmitter M2 has been subjected to a radio signal transmission state, it begins to send out a reception limit signal from the output portion M4 outside.

When the transmitter M2 is powered due to the received reception limit signal, it is activated. The activated transmitter M2 is stabilized at the time T3 after a certain period of time, and then the transmitter M2 begins to transmit radio-frequency signals such as, for example, audio-frequency signals transferred from the microphone M9 via the antenna M11.

On the other hand, when the sub apparatus S receives the reception limit signal put out from the main apparatus M via the dedicated line L on the input portion S3, the reception limit signal is transferred to the CPU S5 of the sub apparatus S. When the CPU S5 detects the reception limit signal, the receiver regulator S7 is controlled to stop the supply of power to the receiver S1, thereby the reception operation of the receiver S1 is stopped.

In this way, the start of power supply to the transmitter M2 of the main apparatus M, and the end of power supply to the receiver S1 of the sub apparatus S occur substantially simultaneously.

As noted above, because the transmitting of radio frequency signals from the main apparatus M starts at the time T3 after a certain period of time following the start of power supply to the transmitter M2 at the time T2, no power is supplied to the receiver S1 of the sub apparatus S when the main apparatus M starts transmitting of radio frequency signals at the time T3, and the receiver S1 therefore ceases its operation. As a result, the receiver S1 of the sub apparatus S will not be damaged by signals transmitted from the main apparatus M, and output of voice sounds from the speaker S13 of the sub apparatus S will be prevented.

The transmitted waves will be prevented from becoming unstable because the transmission starts after the transmitter M2 has become stable for a certain period of time following the start of power supply to the transmitter M2 of the main apparatus M at the time T2.

When the PTT switch M8 of the microphone M9 connected to the main apparatus M is released, the transmission of the main apparatus M is stopped.

The CPU M5 monitors whether or not the PTT switch M8 has been continuously released for a certain period of time. When the CPU 5 realizes that the PTT switch M8 has been continuously released all that while at the time T5, the transmitter regulator M6 is controlled to stop the supply of power to the transmitter M2. At virtually the same time, the output of reception limit signals that are output from the main apparatus M is stopped.

Because the output of reception limit signals from the main apparatus M is no longer detected in the sub apparatus S parallel with the above operations, power is again supplied to the receiver S1 at the time T5 to resume the reception operation. At that time, the transmission of signals from the main apparatus M has already stopped. In other words, as clearly shown in FIG. 3, the controller of the sub-wireless communication apparatus stops power supply to the receiver of the sub-wireless communication apparatus during an entirety of the time when power is supplied to the transmitter of the main wireless communication apparatus.

Reception is started after the receiver S1 has become stable for a certain period of time upon the resumption of power to the receiver S1 of the sub apparatus S, thereby the reception operation being prevented from becoming unstable.

When the PTT switch M8 of the microphone M9 connected to the main apparatus M is pushed at the time T1 as illustrated above, the reception operation of the receiver S1 of the sub apparatus S is stopped at the time T2 before the transmitter M2 of the main apparatus M actually begins transmitting of signals, thereby preventing the receiver S1 of the sub apparatus S from becoming damaged by some overly strong reception of signals transmitted from the adjacent main apparatus M. Interference of signals is also eliminated well.

On the other hand, providing that the PTT switch M8 of the microphone M9 connected to the main apparatus M is released at the time T4 before returning on the power thereto, accordingly, the transmitter M2 of the main apparatus M is kept powered and the power supply to receiver S1 of the sub apparatus S, in contrast, is kept turned off until the time T5. At time T5, the transmitter M2 and the receiver S1 are switched in reverse respectively, the transmitter M2 of the main apparatus M remains inoperative, that is, the transmitter M2 stops transmitting of radio signals therefrom. Accordingly, the activated receiver S1 of the sub apparatus S will not be subjected to damage by any excessive strong signals arisen accidentally in the main apparatus M.

In the first embodiment of the present invention, though the activated transmitter M2 of the main apparatus M outputs the radio signals from the time T3 until the time T4, the receiver S1 of the sub apparatus S stops receiving radio signals from the time T2 until the time T5 so that the receiver S1 of the sub apparatus S is kept from being damaged by signals transmitted from the main apparatus M.

After the end of transmission from the main apparatus M, the receiver S1 of the sub apparatus S usually resumes the reception operation as a standby wireless communication apparatus.

Figure 3:
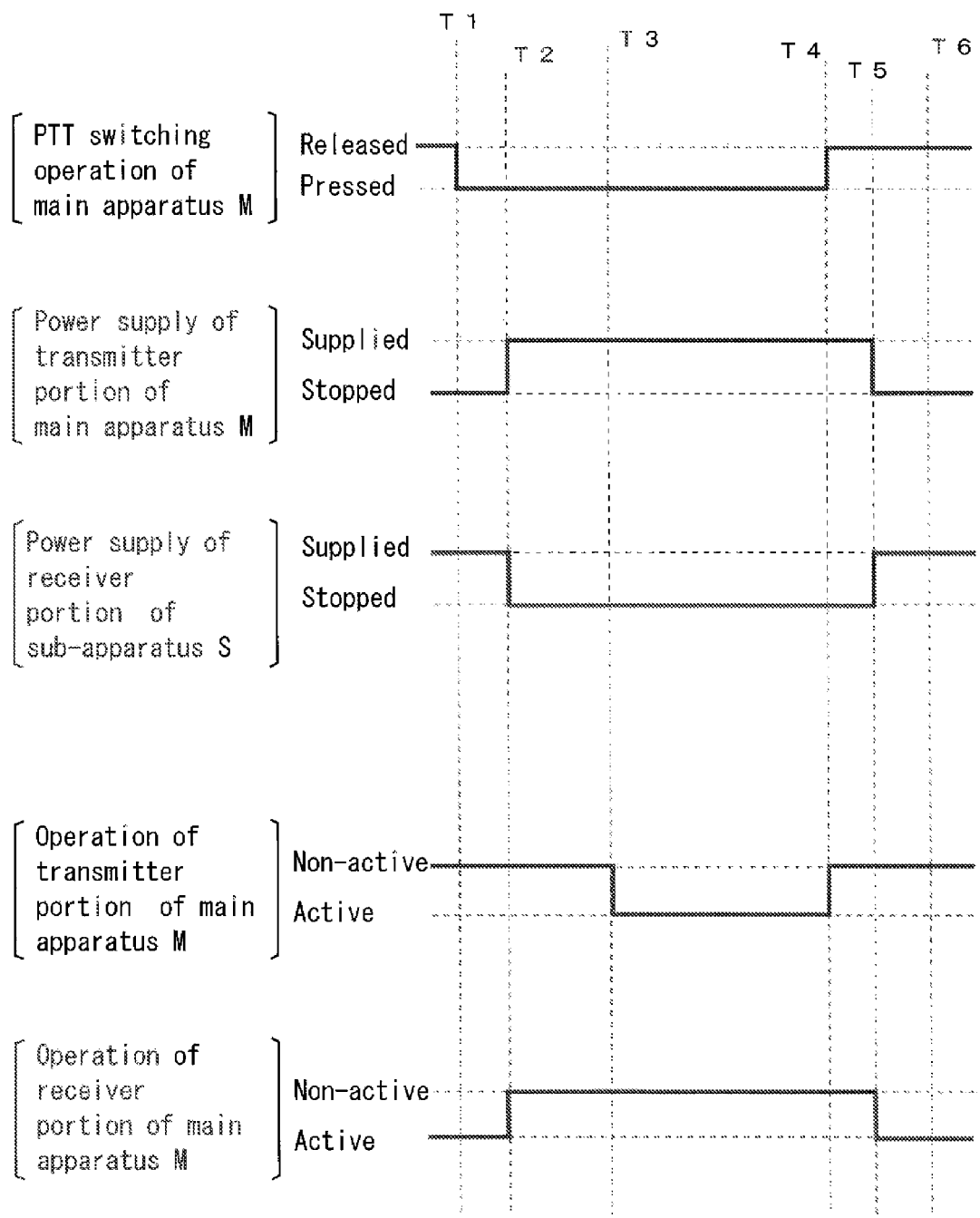
FIG. 3 is a time chart showing the operation of the wireless communication system of FIG. 2.

Alternatively, as illustrated in FIG. 3, the receiver M1 of the main apparatus M may be constrained in a state of being mute from the time T2 until the time T5 during which the transmitter 2 of the main apparatus M is powered so that it will be able to save quite a bit of electric power.

Besides, when the sub apparatus S is used for transmission, the sub apparatus S is operated in the same manner as the main apparatus M described above, and the main apparatus M is operated in the same manner as the sub apparatus S described above.

Further, the set of wireless communication apparatuses is not necessarily limited to only two wireless communication apparatuses. When three or more such communication apparatuses are used, any one transmitting wireless communication apparatus may be used as the main apparatus in the same manner as above, and the other wireless communication apparatuses may be used as the sub apparatuses.

Example 2

The above description was of an example in which the power supply to the receiver 1 was stopped when reception limit signals are input from the outside. However, as a signal attenuation means, for example, a high frequency attenuator 12 can be connected between the receiver 1 and receiving antenna 11, such as in the wireless communication apparatus 10B shown in FIG. 4. When a reception limit signal is input from the outside, in order to avoid damage to the receiver 1 and prevent transmitting inhibitory signals outside, the signal attenuation means 12 can be controlled by the CPU 5 to attenuate the signal incoming through the receiving antenna 11 to the receiver 1.

When, on the other hand, no reception limit signals are input from the outside, the signal attenuation means 12 is controlled by the CPU 5 so that the signals input from the receiving antenna 11 to the receiver 1 are not attenuated and are input to the receiver 1.

According to the present invention, when reception limit signals are input, the signals input to the receiver 1 are attenuated by the signal attenuation means 12 (see FIG. 4). Alternatively, the power supply to the receiver 1 is stopped (see FIG. 1). The receiver 1 is thereby protected, even when the waves transmitted from the main apparatus M are strong.

Also, when reception limit signals are input, the output of the receiver 1 may be rendered mute. This will prevent inhibitory signals from being put out from the speaker of the sub apparatus S even when transmitted waves are output from the main apparatus M.

What is claimed is:

1. A wireless communication system comprising:
a main wireless communication apparatus; and
a sub-wireless communication apparatus adjacent to said main wireless communication apparatus and connected with said main wireless communication apparatus via a dedicated line, each of said main wireless communication apparatus and said sub-wireless communication apparatus including:
   a receiver for reproducing audio signals from radio signals received by an antenna;
   a transmitter for converting audio signals to radio signals and transmitting the radio signals from the antenna as a transmission;
   a controller for controlling operation of said receiver and said transmitter, and for controlling a power supply to said receiver and said transmitter;
   an output portion for outputting signals from said controller; and
   an input portion for inputting signals into said controller;
wherein said main wireless communication apparatus and said sub-wireless communication apparatus are configured and interconnected such that:
   upon a start of power supply to said transmitter of said main wireless communication apparatus, said controller of said main wireless communication apparatus continuously transmits reception limit signals to said controller of said sub-wireless communication apparatus via said dedicated line until the power supply to said transmitter of said main wireless communication apparatus is stopped;
   upon receiving the reception limit signals from said controller of said main wireless communication apparatus and until the reception limit signals are no longer received from said controller of said main wireless communication apparatus, said controller of said sub-wireless communication apparatus stops a power supply to said receiver of said sub-wireless communication apparatus;
   upon elapse of a predetermined period of time after the start of power supply to said transmitter of said main wireless communication apparatus, said controller of said main wireless communication apparatus allows said transmitter of said main wireless communication apparatus to start the transmission of the radio signals while the power supply to said receiver of said sub-wireless communication apparatus remains stopped by said controller of said sub-wireless communication apparatus due to receipt of the reception limit signals from said controller of said main wireless communication apparatus; and
   when the reception limit signals from said controller of said main wireless communication apparatus are no longer received by said controller of said sub-wireless communication apparatus, said controller of said sub-wireless communication apparatus provides a power supply to said receiver of said sub-wireless communication apparatus.

2. The wireless communication system of claim 1, wherein said main wireless communication apparatus and said sub-wireless communication apparatus are further configured and interconnected such that, after detecting that a second predetermined period of time has elapsed after stopping the transmission of the radio signals by said transmitter of said main wireless communication apparatus, said controller of said main wireless communication apparatus stops the power supply to said transmitter of said main wireless communication apparatus and the transmission of the reception limit signals to said controller of said sub-wireless communication apparatus.

3. The wireless communication system of claim 1, wherein said main wireless communication apparatus and said sub-wireless communication apparatus are further configured and interconnected such that, upon receiving the reception limit signals from said controller of said main wireless communication apparatus, said controller of said sub-wireless communication apparatus stops a power supply to said receiver of said sub-wireless communication apparatus simultaneously with the start of power supply to said transmitter of said main wireless communication apparatus.

4. The wireless communication system of claim 1, wherein said main wireless communication apparatus and said sub-wireless communication apparatus are further configured and interconnected such that, upon receiving the reception limit signals from said controller of said main wireless communication apparatus, said controller of said sub-wireless communication apparatus stops a power supply to said receiver of said sub-wireless communication apparatus during an entirety of a time when power is supplied to said transmitter of said main wireless communication apparatus.

5. A method of controlling a plurality of wireless communication apparatuses including a main wireless communication apparatus and a sub-wireless communication apparatus located adjacent to each other and connected by a dedicated line, each of the main wireless communication apparatus and the sub-wireless communication apparatus including a receiver for reproducing audio signals from radio signals received by an antenna; a transmitter for converting audio signals to radio signals and transmitting the radio signals from the antenna as a transmission; a controller for controlling operation of the receiver and the transmitter, and for controlling a power supply to the receiver and the transmitter; an output portion for outputting signals from the controller; and an input portion for inputting signals into the controller, said method comprising:

starting a power supply to the transmitter of the main wireless communication apparatus;

upon said starting of the power supply to the transmitter of the main wireless communication apparatus, continuously transmitting reception limit signals to the controller of the sub-wireless communication apparatus via the dedicated line using the controller of the main wireless communication apparatus until the power supply to the transmitter of the main wireless communication apparatus is stopped;

upon receiving the reception limit signals transmitted by the controller of the main wireless communication apparatus and until the reception signals are no longer received from the controller of the main wireless communication apparatus, stopping a power supply to the receiver of the sub-wireless communication apparatus, said stopping of the power supply to the receiver of the sub-wireless communication apparatus being performed using the controller of the sub-wireless communication apparatus;

upon elapse of a predetermined period of time after said starting of the power supply to the transmitter of the main wireless communication apparatus, using the controller of the main wireless communication apparatus to allow the transmitter of the main wireless communication apparatus to start the transmission of the radio signals while the power supply to said receiver of the sub-wireless communication apparatus remains stopped by the controller of the sub-wireless communication apparatus due to receipt of the reception limit signals from the controller of the main wireless communication apparatus; and when the reception limit signals from the controller of the main wireless communication apparatus are no longer received by the controller of the sub-wireless communication apparatus, providing a power supply to the receiver of the sub-wireless communication apparatus using the controller of the sub-wireless communication apparatus.

6. The method of claim 5, further comprising:

detecting that a second predetermined period of time has elapsed after stopping the transmission of the radio signals by the transmitter of the main wireless communication apparatus; and after said detecting, stopping the power supply to the transmitter of the main wireless communication apparatus and stopping the transmission of the reception limit signals to the controller of the sub-wireless communication apparatus using the controller of the main wireless communication apparatus.

7. The method of claim 5, wherein said stopping of the power supply to the receiver of the sub-wireless communication apparatus is performed simultaneously with said starting of the power supply to the transmitter of the main wireless communication apparatus using both the main wireless communication apparatus and the sub-wireless communication apparatus.

8. The method of claim 5, wherein said stopping of the power supply to the receiver of the sub-wireless communication apparatus is performed during an entirety of a time when power is supplied to the transmitter of the main wireless communication apparatus.

* * * * *